A. BARTELS.
MAGNETIC OPERATING MEANS FOR CAMERA SHUTTERS.
APPLICATION FILED JUNE 10, 1907.
900,344.
Patented Oct. 6, 1908
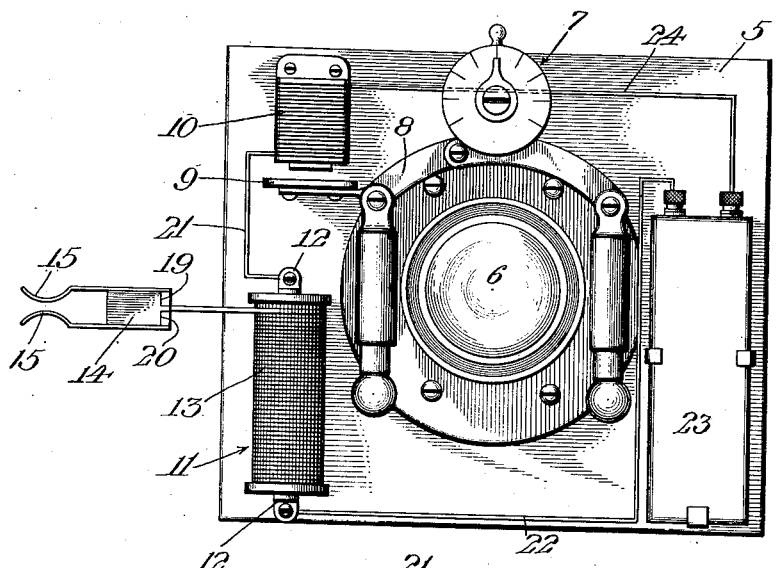
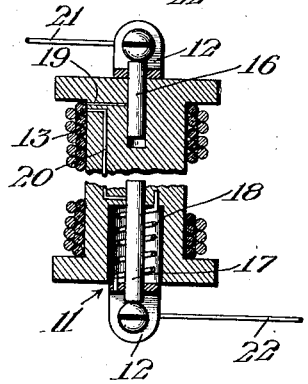
Witnesses:
Inventor
Arnold Bartels,
By Hazard & Strauss
Attorneys

UNITED STATES PATENT OFFICE.

ARNOLD BARTELS, OF LOS ANGELES, CALIFORNIA, ASSIGNOR OF ONE-HALF TO ROSA HUG, OF LOS ANGELES, CALIFORNIA.

MAGNETIC OPERATING MEANS FOR CAMERA-SHUTTERS.

No. 900,344.　　　　　Specification of Letters Patent.　　　　Patented Oct. 6, 1908.

Application filed June 10, 1907. Serial No. 378,055.

*To all whom it may concern:*

Be it known that I, ARNOLD BARTELS, a citizen of the United States, residing at Los Angeles, in the county of Los Angeles and State of California, have invented new and useful Improvements in Magnetic Operating Means for Camera-Shutters, of which the following is a specification.

My invention relates to magnetic operating means which may be attached to a camera shutter and take the place of the ordinary air bulb for operating the same; and the object thereof is to provide means whereby the operator may stand away at a considerable distance and operate the camera shutter accurately. I accomplish this object by means of the device described herein and illustrated in the accompanying drawings, in which:—

Figure 1—is an elevation of the front board of a camera equipped with my improved means for operating the shutter. Fig. 2—is a sectional view of the spring operated reel for the connecting cord.

Referring to the drawings, 5 designates the front board of a camera equipped with lens 6 and shutter mechanism 7, both of usual construction. On one of the shutter operating arms 8 an armature 9 is rigidly secured and adapted to be acted on by electro-magnet 10 secured to front board 5. On the front board and at one side of the lens is mounted a reel 11 adapted to rotate in bearings 12 and carrying connecting cord 13 which is attached at its outer end to a switch 14 provided with spring contacts 15. Reel 11 rotates on two studs 16 and 17, being actuated to wind up connecting cord 13 by a spiral spring 18 secured at one end to bearing 12, and at the other to the body of the reel. Wire 19 connects with stud 16 and wire 20 connects with stud 17, both running through cord 13 and connecting at their outer ends to spring contacts 15. One of bearings 12 is connected by wire 21 to electro-magnet 10 while the other is connected by wire 22 to one side of battery 23 secured to front board 5. The other side of battery 23 is connected by wire 24 to electro-magnet 10.

When spring contacts 15 are forced into engagement with each other a circuit is set up from battery 23 through wire 22, bearings 12, stud 17, wire 20, spring contacts 15, wire 19, stud 16, bearings 12, wire 21, electro-magnet 10 and wire 24 back to battery 23. Electro-magnet 10 is thus energized and attracts armature 9 to operate the shutter through operating arm 8 and as the shutter is operated in exactly the same manner as with the ordinary air bulb the action of the shutter itself is not affected.

It will be observed that the operation of my mechanism is extremely simple and sure. The operator may stand at a considerable distance from the camera as a large amount of connecting cord 13 may be wound on reel 11 without affecting the action of the mechanism in any way whatsoever. The cord may be made so small as to be invisible in the ordinary camera picture and thus enable the operator to take a picture of himself without any evidence of his being connected with the camera.

Having described my invention what I claim as new and desire to secure by Letters Patent is:—

1. In a device of the class described, electro-magnetic shutter operating means mounted on the front board of the camera, a reel mounted on the front board, a connecting cord composed of two wires mounted on said reel, means to electrically connect the two wires of said cord together, and a source of electrical energy connected in series with said electro-magnetic means and the wires of said connecting cord.

2. In a device of the class described, a shutter operating arm, an armature rigidly affixed to said arm, an electro-magnet mounted on the front board of the camera and adapted to actuate said armature, a reel mounted on the front board, means to rotate said reel, a connecting cord composed of two wires wound on said reel, a switch on one end of said connecting cord adapted to connect the two wires of said cord together, and a source of electrical energy connected in series with said electro-magnet and said connecting cord.

3. In a device of the class described a camera having a front board with a shutter mounted thereon, an armature mounted on the shutter operating arm, an electro magnet mounted on the front board adjacent said armature, a reel revolubly mounted on the front board, spring means to rotate said reel, a connecting cord composed of two wires wound on said reel, a switch in the outer end of said connecting cord, said switch being connected to said wires, and a battery connected in series with said electro-magnet and said wires.

4. A device of the class described comprising an electro-magnetic shutter operating means mounted on the front board of the camera, a reel mounted on the front board, a pair of wires wound on said reel, the outer ends of said wires adapted to be connected together, and a source of electrical energy connected in series with said wires and said shutter operating means.

In witness that I claim the foregoing I have hereunto subscribed my name this 31st day of May, 1907.

ARNOLD BARTELS.

Witnesses:
 TRIMBLE BARKELEW,
 MYRTLE A. JONES.